United States Patent [19]

Baunach et al.

[11] Patent Number: 4,545,015

[45] Date of Patent: Oct. 1, 1985

[54] WORD PROCESSING SYSTEM WITH FOREGROUND/BACKGROUND CAPABILITY

[75] Inventors: Steven C. Baunach, San Jose; James A. Riley, Santa Clara; Lucy Okimura, Milpitas, all of Calif.

[73] Assignee: Pitney Bowes Inc., Stamford, Conn.

[21] Appl. No.: 453,390

[22] Filed: Dec. 27, 1982

[51] Int. Cl.[4] .............................. G06F 3/14; G06F 3/04
[52] U.S. Cl. ......................................................... 364/200
[58] Field of Search ... 364/200 MS File, 900 MS File; 340/723, 724

[56] References Cited

U.S. PATENT DOCUMENTS

| | | | |
|---|---|---|---|
| 4,191,956 | 3/1980 | Groothuis | 364/900 X |
| 4,387,424 | 7/1983 | Frediani et al. | 364/200 |
| 4,398,246 | 8/1983 | Frediani et al. | 364/200 |
| 4,398,264 | 8/1983 | Couper et al. | 364/900 |
| 4,470,042 | 9/1984 | Barnich et al. | 340/723 |

Primary Examiner—Harvey E. Springborn
Attorney, Agent, or Firm—Robert H. Whisker; William D. Soltow, Jr.; David E. Pitchenik

[57] ABSTRACT

A word processing system having foreground and background modes of operation, wherein the full capability of the word processing system is available to both the foreground mode and background mode. The system comprises a display, a processor system for processing information and controlling the display and having foreground/background capability so that two jobs may run concurrently, a first buffer for storing information relating to a first job being run in the foreground mode, a second buffer for storing information relating to a second job being run in the background mode, and an input device for entering textual and command information into the system. Information in the first buffer is displayed on the display. Upon receipt of a command from the input device the processor enters the background mode and interchanges the buffers so that information relating to the background job is displayed, and upon receipt of a second, subsequent command, the processor returns to the foreground mode and again interchanges the buffers. In a preferred embodiment the processor system comprises first and second processors interconnected so that either may access the memory of the other.

20 Claims, 3 Drawing Figures

WORD PROCESSING SYSTEM WITH FOREGROUND/BACKGROUND CAPABILITY

BACKGROUND OF THE INVENTION

The subject invention relates to word processing systems and, more particularly, to word processing systems having foreground and background modes of operation.

It is well known that the most modern and powerful word processing systems possess all the essential attributes of general purpose computers: memory, CPUs and I/O devices. Word processing systems differ only in that they are particularly adapted for text manipulation. Thus the most powerful word processors will include multiple line displays on which textual material being processed is displayed. Text is processed by specialized text manipulation functions in response to operator commands. Because text manipulation requires a large amount of operator intervention, and because word processing systems operate at rates many times faster than operators can input data through a keyboard, the utilization of word processing systems is very low. To increase utilization, it is known in the word processing art to operate word processing systems in what is known as foreground/background modes. That is, the word processing systems were programmed to performed two independent jobs concurrently. In the foreground, the operator would typically be performing text manipulation (i.e., inputting text, editing text, etc.). In the background, a second, independent job would run concurrently. The second job would typically be a job requiring little or no operator intervention, such as printing output or sorting data bases. In such prior art word processing systems, the background task's ability to interact with the operator was limited to simple clues such as flashing lights or brief status messages on a status line on the display. Because of the limited communication between the operator and the background task in previous word processing systems, only a small portion of the power of the word processing system was available for background tasks. In particular, tasks requiring extensive operator intervention, such as text insertion or editing, could not be run and background tasks were limited to tasks such as printing or records processing.

In the currently pending, commonly assigned U.S. patent application entitled CIRCUIT TO ENABLE FOREGROUND AND BACKGROUND PROCESSING IN A WORD PROCESSING SYSTEM WITH CIRCUIT FOR PERFORMING A PLURALITY OF INDEPENDENTLY CONTROL FUNCTIONS, Ser. No. 177,308, filed Aug. 12, 1980, which issued Aug. 9, 1983 as U.S. Pat. No. 4,398,264, a word processing system with foreground/background processing is taught. The word processing system of that invention has both a full page display and a keyboard with a single line display, and an illuminated key by means of which the operator may command the word processing system to switch between the foregound and the background. When the background task requires operator intervention, the system causes the illuminated key to flash. The operator may then switch to background and a message is shown on the one line display defining the required operator response. In principle, the system makes the full power of the word processing system available in the background mode. However, in practice, the lack of a multiline display for the background severally limits the ability of the operator to use the editing, and other text manipulation, capabilities of the word processing system in the background mode.

Thus, it is an object of the subject invention to provide a word processing system having foreground and background modes of operation wherein the full capabilities of the word processing may be used in the background mode.

In particular, it is an object of the subject invention to provide a word processing system wherein the operator may readily intervene in the background task with the full text manipulation capabilities of the word processing system available.

It is another object of the subject invention to provide a word processing system wherein the full display capabilities of the word processing system are available for the background task.

BRIEF SUMMARY OF THE INVENTION

The above objects are achieved and the disadvantages of prior art are overcome in the subject invention by a word processing system comprising a display for displaying text and a processor system for processing information and for controlling the display, the processor system having the capability for foreground/background operation, whereby a first job may run in the foreground while a second job runs independently and concurrently in the background. The word processing system also comprises a first buffer for storing display information relating to the first job, the first buffer being operatively associated with the display and the processor system so that at least a portion of the information in the first buffer is displayed by the display, and a second buffer for storing display information relating to a second job, the second buffer being interactive with the processor system. An input device for entering textual information and commands into the word processing system is also provided. The input device operates under control of the foreground so that an operator may intervene in the processing of the first job. The processor system of the word processor of the subject invention is responsive to a command from the input device for interchanging the buffers and for transferring control of the input device to the background so that the operator may intervene in the processing of the second job and is responsive to a second subsequent command from the control means for again interchanging said buffers and retransferring control of the input device to the foreground.

In a preferred embodiment of the subject invention, the processor system further comprises a first processor controlling the input device and also controlling the display, a second processor controlling a mass data storage device and a communications bus interconnecting the processors so that either of them may access the memory of the other.

In a more preferred embodiment of the subject invention, the foreground operates under control of the above-described first processor and the background operates under control of the above-described second processor.

The subject invention further provides a method for switching between a foreground mode and a background mode in a word processing system having foreground/background operation comprising the steps of maintaining in the foreground a first buffer containing display information relating to a job running in the foreground, the buffer being operatively associated with the display so that the contents of the buffer are displayed, maintaining in the background a second buffer containing display information relating to a second job running in the background, interchanging the buffers in response to a command from an input device and transferring control of the input device to the background whereby an operator may intervene in the processing of the second job, and again interchanging the buffers in response to a second subsequent command from the input device and retransferring control of the input device back to the foreground.

Thus, the subject invention advantangeously provides a word processing system wherein the operator may readily switch from foreground to background mode and back, while having the appropriate textual information displayed at all times.

It is another advantage of the subject invention that the full range of text manipulation capabilities of the word processing system of the subject invention are available to both foreground and background jobs.

Other objects and advantanges of the subject invention will be readily apparent to those skilled in the art upon consideration of the detailed description set forth below and the attached drawings.

DETAILED DESCRIPTION OF THE PREFERRED EMBODIMENT OF THE INVENTION

Figure 1:
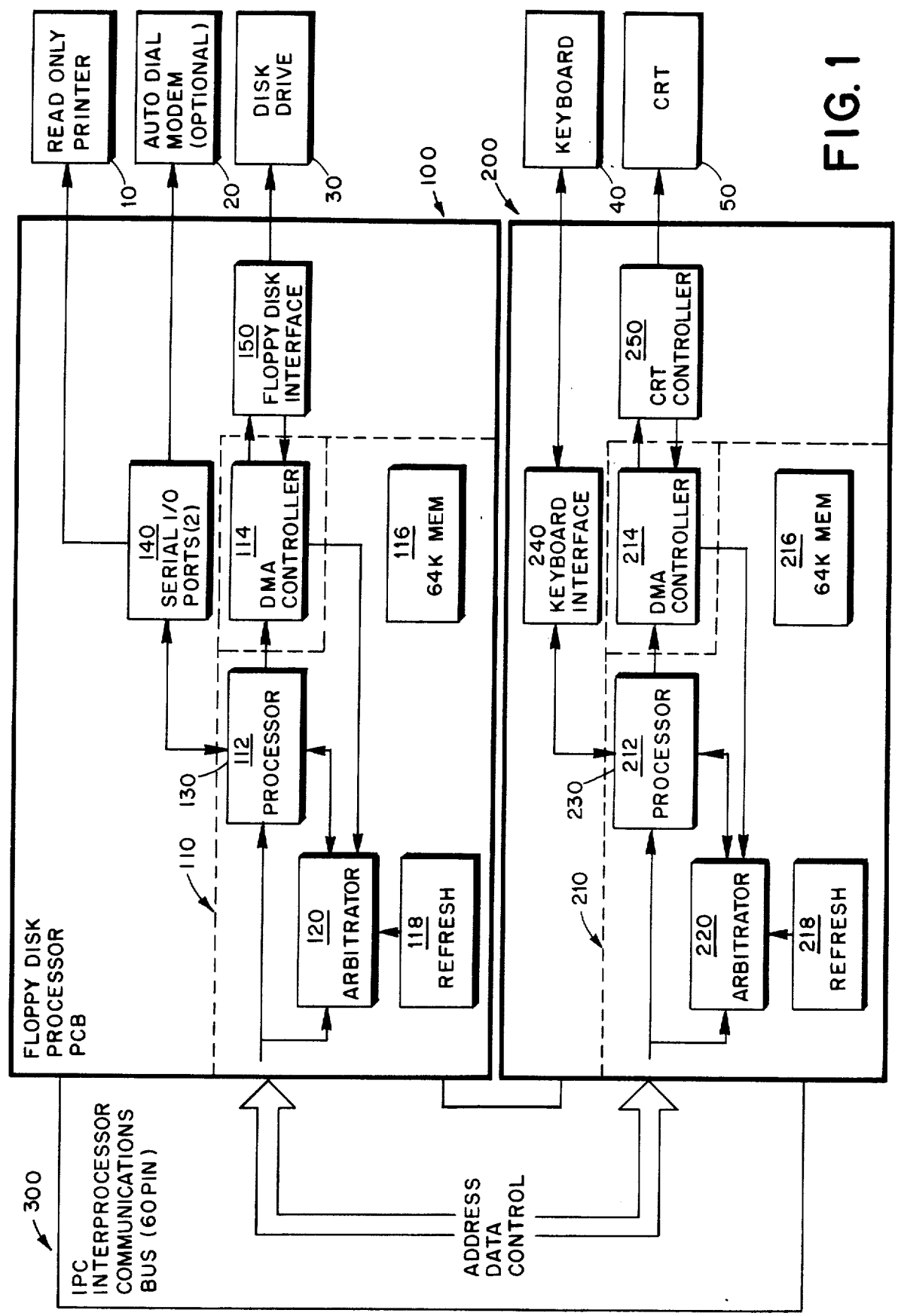
FIG. 1 is schematic block diagram of a word processing system in accordance with the subject invention.

Turning now to FIG. 1, there is shown a word processsing system in accordance with the subject invention. The word processing system of FIG. 1 comprises conventional peripheral equipment comprising read only printer 10, which in a preferred embodiment may be Ricoh model numbers 1300 or 1600, available from Ricoh of America, Fairfield, N.J., optional autodial interface 20, which in a preferred embodiment may be a Universal Data System model number 2127, available from Universal Data Systems, Sunnyvale, Calif., and disk drive 30, which in a preferred embodiment may be CDC model number RN-77711503-ID-BR9B2A, available from Control Data Corporation, Oklahoma, Okla., which operate under control of the floppy disk processor printed circuit board 100, and keyboard 40, which includes alphanumeric and command keys, including the "background" command key, and CRT 50, which in an preferred embodiment may be Motorola model number D53003-300A, available from Motorola Corporation, Schaumburg, Ill., which operate under control of CRT processor printed circuit board 200. Printed circuit board 100 and 200 each further comprise substantially identical processors, floppy disk processor 110 and CRT processor 210. Each of these processors further comprise a number of conventional commonly available IC chips including CPU chips 112 and 212, which in the preferred embodiment shown may be Intel model number 8085A, available from Intel Corporation, Sunnyvale Calif., or equivalent, DMA chips 114 and 214, which in the preferred embodiment shown may be Intel model number P8237A-5, or equivalent, and dynamic memories 116 and 216, which in the preferred embodiment shown comprise Intel model number 4164 16K memory chips, or equivalent. Conventional memory refresh circuitry 118 and 218 and arbritration logic circuitry 120 and 220 are also provided in processors 110 and 210 to support the operation of memory 116 and 216. The above-described IC chips and circuitry are interconnected in a conventional manner well understood by those skilled in the art to form microprocessors having 64K of random access memory. Each of processors 110 and 210 also has I/O ports 130 and 230 as well as high speed access to memory through DMA chips 114 and 214 which operate under the control of devices external to processors 110 and 210. Read only printer 10 and optional autodial interface 20 are controlled by processor 110 through I/O port 130 and serial I/O port 140. Keyboard 40 is controlled by processor 210 through I/O port 230 and keyboard interface to 40. In the preferred embodiment shown, keyboard interface 240 may comprise a conventional, commonly available chip such as Intel mode number AY-3-1015D UART, or equivalent. Disk drive 30 and CRT 50 require high speed access to memory and are respectively controlled through DMA's 114 and 214 and floppy disk interface 150, which may be an Intel model number 1791 controller, or equivalent, and CRT interface 250 which may be an Intel model number 8275 CRT controller or equivalent. Processors 110 and 210 communicate with each other through bus 300. Bus 300 carries both data and address information and is connected to CPU's 112 and 212 and to arbitration logic circuits 120 and 220. Thus, either processor may communicate with the other by overwritting the other's memory. A more detailed description of such interprocessor communication may be found in the copending commonly assigned Patent Application Ser. No. 177,308, cited above.

In the preferred embodiment described above, the system shown in FIG. 1 is programmed as a word processing system in a conventional manner well known to those skilled in the art. Thus, processor 210 is programmed with particular routines for controlling the keyboard and the CRT while processor 110 is programmed with particular routines for controlling the floppy disk 30, the optional autodial interface 20 and the read only printer 10. Each of processors 110 and 210 is also programmed with particular communication routines allowing the processors to communicate and transfer data from memory to memory.

Processors 110 and 210 are also programmed with system routines which allow the particular routines described above to interact so that the word processor system may carry out the various functions which typify a word processing system. Thus, when an alphanumeric key is stroked on keyboard 40, the corresponding character code is transferred through keyboard interface 240 CPU to 12 under control of the keyboard routine. The CRT routine then causes a visual representation of the characters to be displayed in the appropriate place on the CRT. In response to various commands generated by the opperator using special keys on keyboard 40 (or special keys and alphanumeric keys in combination), the character and or its corresponding code may be moved on the CRT, replaced by new characters, duplicated, stored on the floppy disk 30, printed by read-only printer 10 and otherwise operated on in various manners well known to those skilled in the art. Those skilled in the art will also be aware that these operations may be carried out not just on single characters but also on groups of characters comprising words, sentences, paragraphs or larger blocks of text. By appropriately choosing a sequence of such operations, the operator may execute combinations of operations to perform the tasks (e.g. text entry, editing, storage, retrieval and printing) that make-up word processing jobs.

In order that the display on CRT 50 appropriately corresponds to the text being processed, the system maintains a refresh buffer in a region of memory 216. This buffer contains character codes in essentially one-to-one correspondence to the display on CRT 50 and is directly accessed by CRT controller 250 through DMA controller 240 to refresh the CRT display once per frame. Thus, as the contents of the refresh buffer are updated by the system routine, the CRT display changes to conform. For convenience, the system routine is run in processor 210 since processor 210 controls keyboard 40 and CRT 50 and normal word processing involves extensive operator interaction with the system through keyboard 40 and CRT 50.

A similar routine is also run in processor 110, which is substantially identical to processor 210. Thus, any job which may be performed by processor 210 may also be performed by processor 110 concurrently. (By concurrently herein is meant that jobs are performed simultaneously and independently under control of processor 110 or 210 except as one processor or the other must wait for access to shared resources.)

Since, however, the word processing system has only one CRT and one keyboard, jobs executed under control processor 110 are normally jobs requiring little operator intervention, such as records processing, file sorting or printing. Jobs run under the control of processor 210 are referred to as being run under control of a foreground; those jobs run under control of processor 110 are referred to as being run under control of the background. As will be described more fully below, when the operator may interact with the foreground job, the word processing system is referred to as being in the foreground mode while when the operator may interact with the background job, the word processing system is referred to as being in the background mode.

In order to allow the operator to interact with the background job, processor 110 is programmed to maintain a buffer in a region of memory 116. This buffer is essentially identical to the refresh buffer in memory 216, but of course, is not read by the CRT control routine. Processor 110 is also programmed with particular routines to allow the word processing system to switch between modes. A "background keyboard filter" interfaces the keyboard control routine to processor 110 to detect requests from keyboard 40 to switch modes, to allow keyboard 40 to input to processor 110 when the word processing system is in the background mode and to allow the background job to signal the operator when intervention by the operator is necessary." A "background process" receives requests for mode switch through the "keyboard filter" and determines if the background is available and if the request is legitimate. The "background process" is particularly necessary in word processing systems having more than one keyboard and operator to insure that mode switches return control of jobs to the appropriate operator. If the "background process" determines that the requested modes switch is allowable it calls up the "CRT context switch manager" to interchange the CRT buffer with the background buffer so that CRT 50 displays the context appropriate to the other jobs being run and signals the operator through the keyboard control routine. If the "background process" determines that the background is not available, it signals that to the operator through the "keyboard filter" and the keyboard control routine.

In the preferred embodiment shown in FIG. 1, a portion of the screen on CRT 50 is reserved as a status line. Status information may be communicated from the "background process" to the operator through the keyboard control routine and the CRT routine and displayed on the status line. A request for operator intervention in the background job is also displayed on the status line.

Figure 2A:
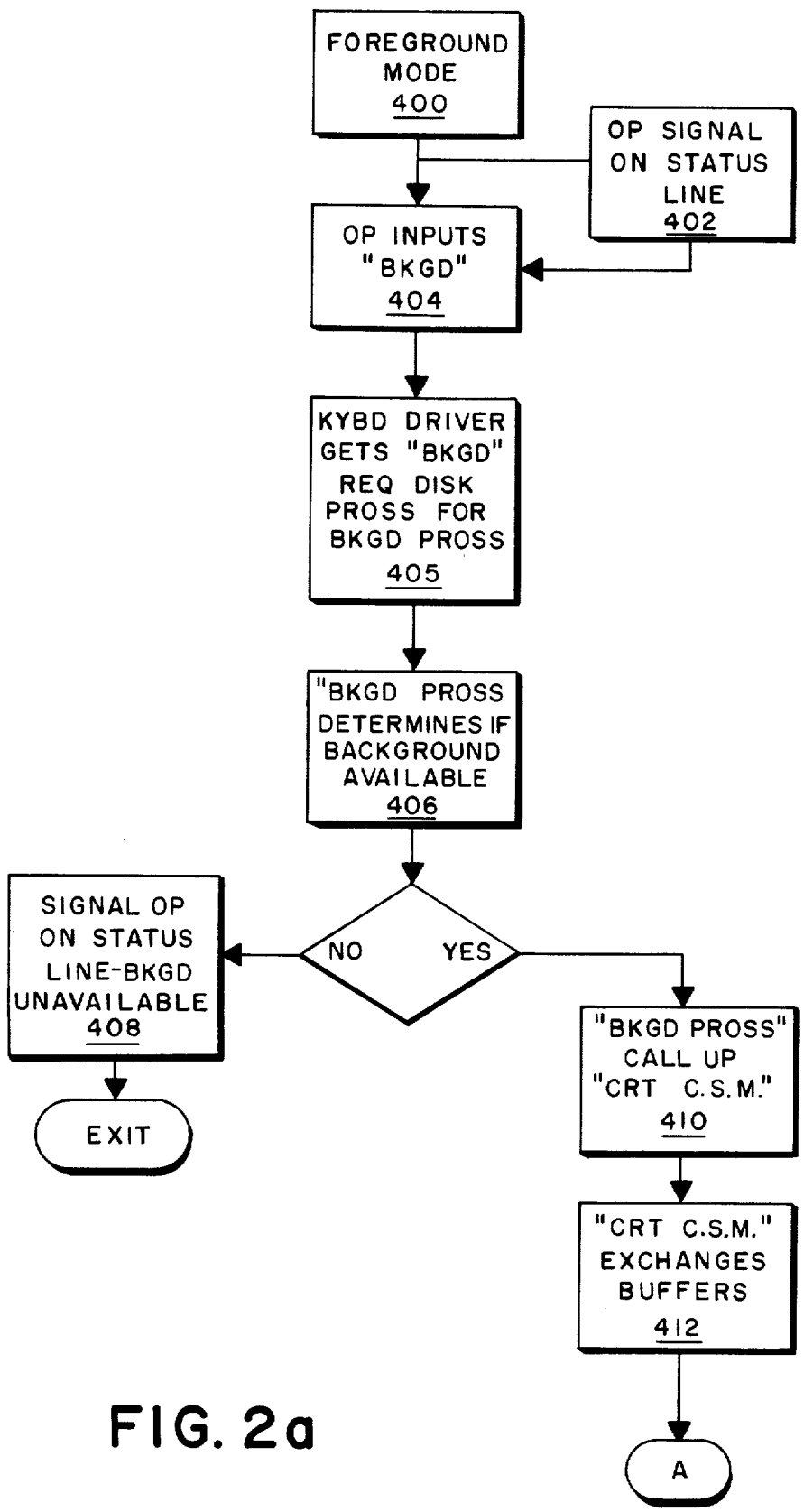
FIGS. 2a and 2b together are a flow chart of the operation of the word processing system of the subject invention in transferring between the foreground and background modes of operation.
Figure 2B:
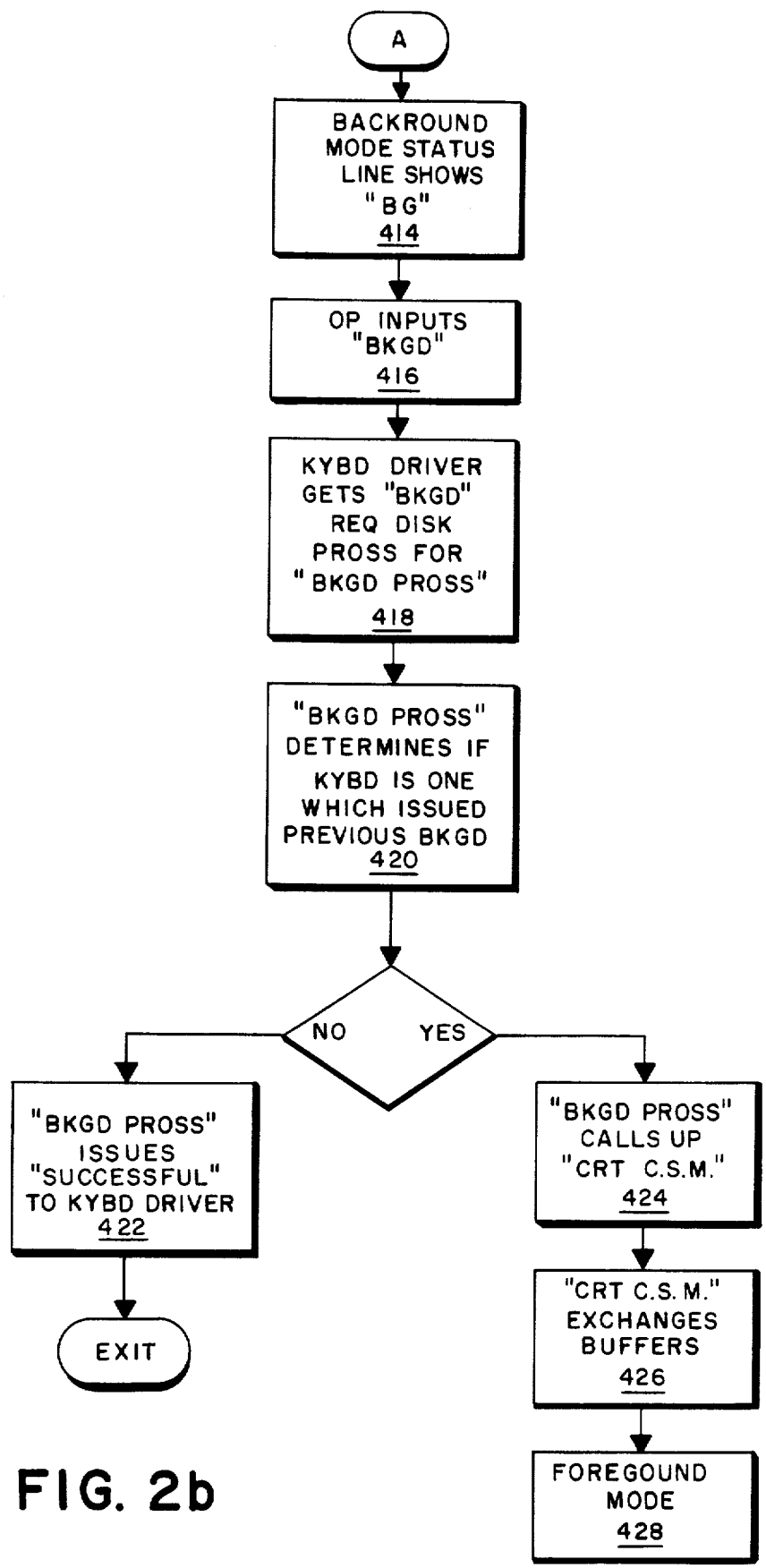

Turning now to FIGS. 25 and 26, there is shown a flow chart of the mode switch process in the subject word processing system. Initially, the word processing system is in the foreground mode at 400 in FIG. 2. Either in response to a signal from the background job 402 or on the operators own initiative the operator issues the command BKGD 404 through keyboard 40. This command is passed 405 by the keyboard control routine through the "keyboard filter" to the "background process" which determines 406 if the background is available to the keyboard. If it is not, the background processors returns an appropriate message to operator 408 and exits. If the background is available, the background processors calls up the CRT context switch manager 410 which interchanges the refresh buffer and the background buffer. The word processing system is now in the background mode. The CRT displays the background job context and the status line indicates background mode status 414. To return to the foreground mode, the operator again issues the command BKGD through keyboard 40 and the command is again passed by the keyboard routine and the "keyboard filter" to the "background process" 418. The background process determines 420 if the keyboard is the one which issued the previous request. If it is not, the background process issues a "successful" message to the keyboard control routine and exits 422. If it is, the background process calls up the "CRT context switch manager" 242, which interchanges the buffers again so that the word processing system is in the foreground mode 428. Note that in the background mode, the foreground job cannot signal the operator for intervention.

It should also be noted that in a preferred embodiment of the subject invention, the word processing system is "menu-driven". That is, the operator may select certain operating parameters for both the foreground and background mode from menus displayed on CRT 50. In the preferred embodiment, the background parameters will be updated to conform to the current foreground parameters between background jobs but foreground parameters are not updated to conform to the changes made in the background mode.

The above description of the preferred embodiment of FIG. 1 is given by way of example and illustration only and other embodiments of the subject invention will be apparent to those skilled in the art. In particular, it is noted that the subject invention may be embodied in configuration having additional processors controlling additional keyboards and CRTs or may be embodied in a word processing system with a single high performance processor operating in a multi-programming mode to control both foreground and background mode. Also, certain functions which are, in the above-described embodiments, carried out by software may in other embodiments be carried out by hardware logic or firm ware. Thus, the limitations of the subject invention are to be found only in the claims set forth below.

What is claimed is:

1. A word processing system, comprising:
   (a) display means for displaying text;
   (b) processing means for processing information and for controlling said display means, said processing means having means for running a first job in a foreground mode while a second job runs independently and concurrently in a background mode.
   (c) first buffer means for storing display information relating to said first job, said buffer means interacting with said display means and said processing means so that at least a portion of said display information in said first buffer means is displayed by said display means;
   (d) second buffer means for storing display information relating to said second job, said second buffer means interacting with said processing means;
   (e) input means for entering textual information and commands into said system, said input means including means for operating under the control of said first job so that an operator may intervene in the processing of said first job; and,
   (f) said processing means including means responsive to a particular command from said input means to interchange said buffer means and to transfer control of said input means to said second job so that said operator may intervene in the processing of said second job; and including means responsive to a subsequent particular command from said input means to again interchange said buffer means and retransfer control of said input means to said first job.

2. A word processing system as described in claim 1 wherein said processing means at least further comprises:
   (a) a first processor, having a first associated memory, controlling said input means and controlling said display means;
   (b) a second processor, having a second associated memory, controlling a mass data storage device for providing additional storage capacity; and,
   (c) communications means for interconnecting said processors so that either of said processors may access the memory of the other.

3. A word processing system as described in claim 2 wherein said foreground job operates under control of said first processor and said background job operates under control of said second processor.

4. A word processing system as described in claim 3 further comprising a third processor, having a third associated memory, interconnected with said first and second processors by said communications means, said third processor controlling an additional input means and an additional display means.

5. A word processing system as described in claim 4 wherein said third processor includes means for providing a second foreground wherein a third job is run under control of said third processor.

6. A word processing system as described in claim 5 wherein said third processor further includes a random access memory and wherein a third buffer means comprises a selected portion of said random access memory of said third processor, said third buffer means storing display information relating to said third job and said third buffer means interacting with said third processor and with said display means controlled by said third processor so that at least a portion of said information in said third buffer is displayed by said display means controlled by said third processor.

7. A word processing system as described in claim 6 wherein said first or third processors are respectively responsive to a command from said first or third input means to request interchange of said second buffer means with the buffer means associated therewith with the input means issuing said command and transfer of the control of that input means to said background job, and wherein said second processor is responsive to a subsequent command from said issuing input means requesting that said second buffer means and said associated buffer means be interchanged again and control of said issuing command means be returned to the associated foreground job.

8. A word processing system as described in claim 7 wherein said second processor includes means responsive to said interchange requests from said first and third processors to arbitrate between said request when they conflict.

9. A word processor as described in claim 3 wherein said first and second processors each further includes a random access memory and said first buffer means comprises a selected portion of said random access memory of said first processor and said second buffer means comprises a selected portion of said random access memory of said second processor.

10. A word processing system as described in claim 9 wherein said processing means further includes a control means for controlling a portion of said display means to display status information, said status information including information to inform an operator as to the foreground mode/background mode status of said system.

11. A word processing system as described in claim 2 further comprising a third processor, having a third associated memory, interconnected with said first and second processors by said communications means, said third processor controlling an additional input means and an additional display means.

12. A word processing system as described in claim 11 wherein said third processor includes means for providing a second foreground capability whereby a third job is run under control of said third processor.

13. A word processing system as described in claim 12 wherein said third processor further includes a random access memory and wherein a third buffer means comprises a selected portion of said random access memory of said third processor, said third buffer means storing display information relating to said third job and said third buffer means interacting with said third processor and with said display means controlled by said third processor so that at least a portion of said information in said third buffer is displayed by said display means controlled by said third processor.

14. A word processing system as described in claim 13 wherein said first or third processors are respectively responsive to a command from said first or third input means to request interchange of said second buffer means with the buffer means associated therewith with the input means issuing said command and transfer of the control of that input means to said background job, and wherein said second processor is responsive to a subsequent command from said issuing input means requesting that said second buffer means and said associated buffer means be interchanged again and control of said issuing command means be returned to the associated foreground job.

15. A word processing system as described in claim 14 wherein said second processor includes means responsive to said interchange requests from said first and third processors to arbitrate between said requests when they conflict.

16. A word processor as described in claim 2 wherein said first and second processors each further includes a random access memory and said first buffer means comprises a selected portion of said random access memory of said first processor and said second buffer means comprises a selected portion of said random access memory of said second processor.

17. A word processing system as described in claim 16 wherein said processing means further includes a control means for controlling a portion of said display means to display status information, said status information including information to inform an operator as to the foreground mode/background mode status of said system.

18. A word processing system as described in claim 17 wherein said status information includes a signal which informs an operator when intervention is needed in said second job.

19. A word processing system as described in claim 1 further including means in said control, and means for signaling an operator, said means interacting with said processing means, whereby said operator may be signaled when intervention is needed in said second job.

20. A method for switching between a foreground mode and a background mode in a word processing system having a multiline display, input means for inputting textual information and commands, and foreground and background operation capability, comprising the steps of:
(a) maintaining, in said foreground mode, a first buffer containing display information relating to a job running in said foreground mode, said buffer, interacting with said mutliline display so that at least a portion of the contents of said buffer are displayed;
(b) maintaining, in said background mode, a second buffer containing display information relating to a second job running in said background mode;
(c) interchanging, in response to a command from said input means for entering textual information and commands, said buffers and transferring control of said input means to said background job, whereby an operator may intervene in the processing of the second job; and,
(d) again interchanging, in response to a second subsequent command from said input means, said buffers and transferring control of said input means back to said foreground job.

* * * * *